United States Patent
Slabaugh et al.

(10) Patent No.: US 7,925,087 B2
(45) Date of Patent: Apr. 12, 2011

(54) METHOD AND SYSTEM FOR IMAGE SEGMENTATION BY EVOLVING RADIAL BASIS FUNCTIONS

(75) Inventors: Gregory G. Slabaugh, Princeton, NJ (US); Gozde Unal, Plainsboro, NJ (US)

(73) Assignee: Siemens Aktiengesellschaft, München ( * ) Notice: Subject to any disclaimer, the term of this patent is extended or adjusted under 35 U.S.C. 154(b) by 834 days.

(21) Appl. No.: 11/926,857

(22) Filed: Oct. 29, 2007

(65) Prior Publication Data

US 2008/0112617 A1 May 15, 2008

Related U.S. Application Data

(60) Provisional application No. 60/865,688, filed on Nov. 14, 2006.

(51) Int. Cl.
G06K 9/34 (2006.01)
(52) U.S. Cl. .......................... 382/173; 382/164
(58) Field of Classification Search .................. 382/164, 382/173
See application file for complete search history.

(56) References Cited

U.S. PATENT DOCUMENTS

| | | | |
|---|---|---|---|
| 5,862,245 A | 1/1999 | Renouard et al. | |
| 6,606,091 B2 | 8/2003 | Liang et al. | |
| 6,731,799 B1 | 5/2004 | Sun et al. | |
| 6,795,069 B2 | 9/2004 | Raskar et al. | |
| 7,031,950 B2 * | 4/2006 | Darken et al. | 706/21 |
| 7,239,719 B2 | 7/2007 | Bongiovanni et al. | |
| 7,680,314 B2 * | 3/2010 | Hong | 382/131 |
| 2004/0257240 A1 * | 12/2004 | Chen et al. | 340/853.1 |
| 2005/0057561 A1 * | 3/2005 | El-Din ElShishiny et al. | 345/419 |
| 2005/0180635 A1 | 8/2005 | Trifonov et al. | |
| 2005/0238233 A1 | 10/2005 | Mulet Parada et al. | |
| 2008/0143718 A1 * | 6/2008 | Ray et al. | 345/424 |

OTHER PUBLICATIONS

Chan et al. ("A boundary hunting radial basis function classifier," Conference: Neural Information Processing Systems—NIPS, pp. 139-146, 1992).*
Morse et al. ("Active contour using a constraint-based implicit representation," IEEE Proc. Computer Vision and Pattern Recognition, Jun. 2005).*
Chan et al. ("Active contours without edges," IEEE Trans. Image Processing, vol. 10, No. 2, Feb. 2001, pp. 266-277).*
Valdes et al. ("Adaptive RBF network with active contour coupling for multispectral MRI segmentation," Proceedings of SPIE, vol. 4684 (2002), pp. 1610-1621).*
Rajguru et al. ("Enhanced level-set approach to segmentation," IEEE Symp. on Image Analysis and Interpretation, Jun. 5, 2006, pp. 71-75).*
Chan et al. ("Image segmentation using level sets and the piecewise-constant Mumford-Shah model," UCLA CAM Report 00-14, 2000).*

* cited by examiner

Primary Examiner — Yubin Hung

(57) ABSTRACT

A method and system for image segmentation by evolving radial basis functions (RBFs) is disclosed. A set of RBFs define a contour on an image. The contour is the zero level set of an implicit function defined by the RBFs. The RBFs are weighted and parameterized by multiple parameters, such as center point, standard deviation, and orientation. The contour is iteratively deformed by updating the weight and each of the parameters of each of the RBFs based on each pixel of the contour, until the contour converges. The parameters and the weight of each RBF is updated using coupled set of differential equations derived based from a region-based or boundary-based image segmentation energy formulation. The final contour at a convergence defines boundaries of a target object or region in the image.

25 Claims, 4 Drawing Sheets

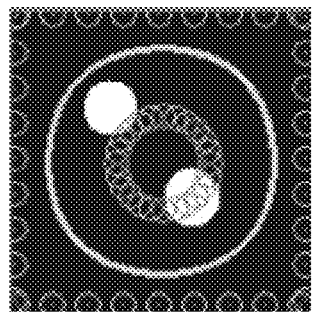 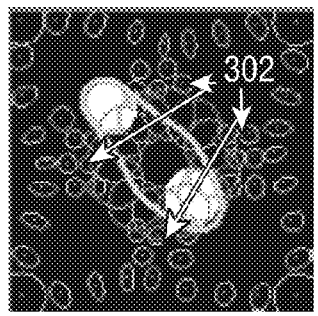 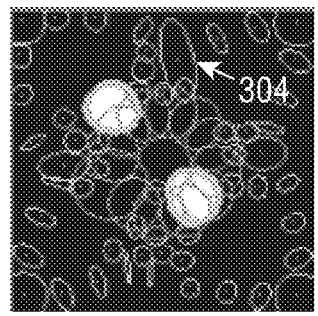
FIG. 3A          FIG. 3B          FIG. 3C
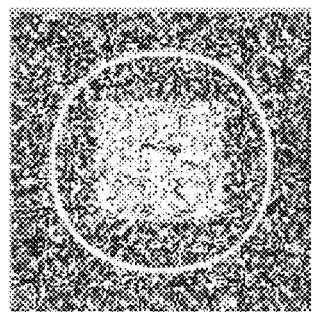 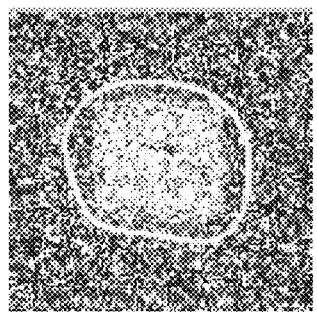 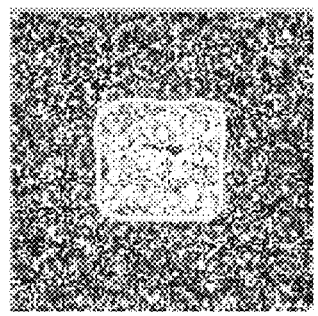
FIG. 4A          FIG. 4B          FIG. 4C
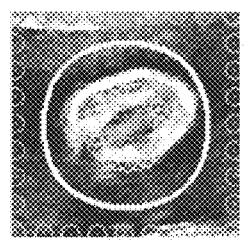 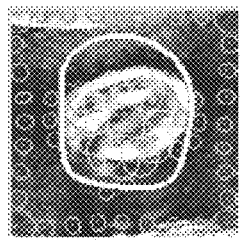 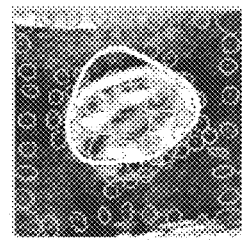 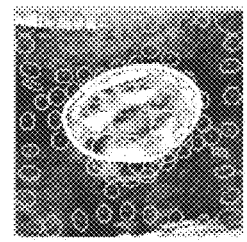
FIG. 5A     FIG. 5B     FIG. 5C     FIG. 5D

METHOD AND SYSTEM FOR IMAGE SEGMENTATION BY EVOLVING RADIAL BASIS FUNCTIONS

This application claims the benefit of U.S. Provisional Application No. 60/865,688, filed Nov. 14, 2006, the disclosure of which is herein incorporated by reference.

BACKGROUND OF THE INVENTION

The present invention relates to image segmentation, and more particularly, to image segmentation using radial basis functions (RBFs).

Since the introduction of active contour methods, they have been successfully used in computer vision applications. Such active contour methods have been used in many important applications, such as image segmentation, 3D scene reconstruction, and object tracking. One reason why active contours have been used so successfully is that they provide a structured approach, via energy minimization, to deform a contour or surface.

In the context of image segmentation, active contours deform based on various image-based and internal forces so that the contour's edges match object or region boundaries in the image, while maintaining smoothness. The smoothness, or regularization terms, provide robustness to noise while providing a measured approach to handling missing or low-confidence data. A typical application of an active contour will start with an initial contour, which is then iteratively deformed until it converges to a solution that balances the forces acting on the contour. Typically, these forces result from analytical expressions that are derived using variational calculus applied to an energy minimization problem. However, it is possible to define the forces directly without using an energy formulation.

In the convention active contour techniques, earlier methods represented the contour using a topologically fixed parametric representation, such as a polyline, spline, etc., specified by a fixed number of control points. Such representations are simple and efficient to implement, however, they lack straightforward mechanisms for topological control. Often in segmentation problems, the topology of the problem is unknown a priori, and the contour must break apart or merge during the evolution of the contour. Such topological changes cannot traditionally be performed by active contours using a topologically fixed parametric representation. Although various methods for providing topological changes have been proposed, the implementation of such methods is complicated and not natural to active contour techniques based on parametric representations.

More recent techniques use implicit active contours, or level-set methods, which represent the contour as a level set of a higher dimensional embedding function. The primary advantage of this representation is that topological changes occur naturally in the evolution of the contour. By manipulating the embedding function, the level set that represents the contour can innately split or merge without requiring any specialized implementation to handle topological changes. However, the embedding function must be updated on a dense set of points, which requires a significant amount of storage, even when using efficient narrowband techniques.

Recently introduced methods attempt to combine some of the advantages of explicit and implicit active contours through the use of radial basis functions (RBFs), or unstructured point clouds. Such methods model an implicit function defining an active contour as a superposition of RBFs. The RBFs define a set of points (each point representing an RBF), from which the embedding function can be calculated. The points (RBFs) are moved (and correspondingly, the embedding function is updated) in order to deform the active contour to solve a segmentation problem. These approaches have been demonstrated to provide the topological flexibility of level set methods with the low storage requirements of parametric representations, and provide flexibility in terms of RBF placement and interaction.

BRIEF SUMMARY OF THE INVENTION

The present invention provides a variational method for evolution of radial basis functions (RBFs) for image segmentation. While conventional active contour methods using RBFs start with a force definition rather than deriving forces, embodiments of the present invention use forces derived through an energy formulation to evolve the RBFs. Based on this derivation, embodiments of the present invention can evolve multiple parameters of each RBF, such as position, weight, anisotropy (orientation, standard deviation along orthogonal directions) of each RBF, whereas conventional methods only evolved RBF positions.

In one embodiment of the present invention, a set of RBFs is initialized to define an implicit function, the zero level set of which defines a contour on an image. The contour is iteratively deformed by updating a weight and multiple parameters of each of the RBFs based on each pixel of the contour, until the contour converges. The parameters of each RBF can include a center point, standard deviation along orthogonal directions, and an orientation. The parameters and the weight of each RBF are updated using a coupled set of differential equations derived based from a region-based or boundary-based image segmentation energy formulation. The final contour at a convergence defines boundaries of a target object or region in the image.

According to another embodiment of the present invention, RBFs can be merged or added between iterations of updating the parameters of the RBFs. If two RBFs are sufficiently close together, they can be replaced by a single RBF, which is a sum of the two RBFs and is centered at a point halfway between center points of the two RBFs. If there is an area of the image that has a high gradient for the implicit function defined by the RBFs, and there is no existing RBF in that area, an RBF can be added to that area.

These and other advantages of the invention will be apparent to those of ordinary skill in the art by reference to the following detailed description and the accompanying drawings.

BRIEF DESCRIPTION OF THE DRAWINGS

FIG. 3 illustrates exemplary image segmentation results in which RBFs are merged and added;

FIG. 4 illustrates exemplary image segmentation results of a noisy image;

FIG. 5 illustrates exemplary image segmentation results of an ultrasound fetal image.

DETAILED DESCRIPTION

Figure 1A:
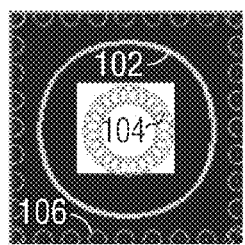
FIG. 1 illustrates image segmentation using derived radial basis function (RBF) evolution equations for region-based and boundary based image segmentation.
Figure 1B:
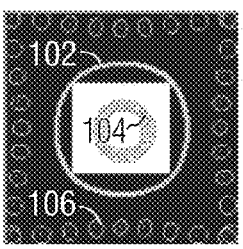
Figure 1C:
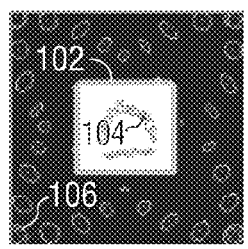
Figure 1D:
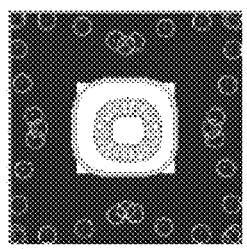
Figure 1E:
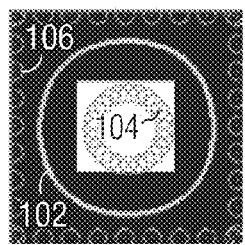
Figure 1F:
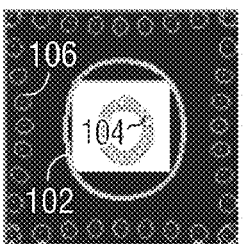
Figure 1G:
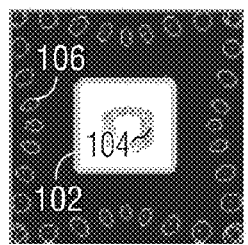
Figure 1H:
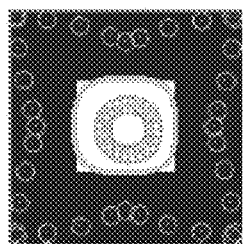

The present invention is directed to a method for image segmentation using radial basis functions (RBFs). Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to evolving a set of radial basis functions in order to segment a region or an object in an image. The set of RBFs define an implicit function, and the zero level set of the implicit function is the active contour. By evolving parameters of the RBFs, the active contour is deformed until it converges such that the contour's edges match object or region boundaries in the image. Embodiments of the present invention use forces derived through an energy formulation to evolve the RBFs. The derivation of these forces results in a set of differential equations that drive the evolution of the RBFs. These equations are derived herein for region-based segmentation problems and edge-based (or boundary-based) segmentation problems. Based on this derivation, it is possible to evolve all parameters of each RBF. Although certain RBFs are used in describing embodiments of the present invention, the present invention is not limited thereto, and can be used with the methodology described herein.

In region-based segmentation methods, the evolution of the active contour is based on attributes of entire regions in the image. As described here, the evolution of the contour is based on the attribute of intensity, but other attributes, such as intensity, color, texture, probabilities, etc., can also be used. Region-based segmentation methods model the image as being composed of distinct regions, each with its own statistics, which are used to deform the active contour towards the region boundaries. This is notably different from edge-based segmentation methods, where the evolution depends on local image gradients. In this sense, region-based segmentation methods are more global and more robust to noise than edge-based methods.

A well-known region-based model is the Mumford-Shah function, which models the image regions as piece-wise smooth functions. For example, in the case of two regions, region R inside the contour C and region $R^C$ outside of the contour C, $$E(f,C) = \int_R (I(x) - f_R(x))^2 dx + \int_{R^C} (I(x) - f_{R^C}(x))^2 dx + \int_{\Omega/C} |\nabla f|^2 dx + \gamma \oint_C ds, \quad (1)$$

where $E(f,C)$ is the energy of the contour, $I(x)$ is the image intensity at pixel x, f is a piecewise smooth function consisting of regions $f_R(x)$ inside C and $f_{R^C}(x)$ outside C, and the last term is a regularization term weighted by a constant $\gamma$. While there are various active contour methods for solving the Mumford-Shah functional, the well-known piecewise constant model of Chan-Vese is a powerful approximation that replaces the piecewise smooth function f with piecewise constant functions in each region. This simplified form can be expressed as:

$$E(c) = \int_R (I(x) - \mu_{in})^2 dx + \int_{R^C} (I(x) - \mu_{out})^2 dx + \gamma \oint_C ds, \quad (2)$$

where $\mu_{in}$ is the average intensity inside C and $\mu_{out}$ is the average intensity outside C. Other variations of the Chan-Vese function exist as well, for example, using various statistics other than or in addition to the mean.

In embodiments of the present invention, the contour $C \in \Omega$ is represented by the zero level set of a Lipschitz function $\phi$: $\Omega \to \Re$, such that:

$$C = \{x \in \Omega : \phi(x) = 0\},$$

$$R = \{x \in \Omega : \phi(x) < 0\},$$

$$R^C = \{x \in \Omega : \phi(x) > 0\}.$$

The embedding function $\phi(x)$ can be modeled using N RBFs $\psi(x, g_{i1} \ldots g_{iM})$ as:

$$\phi(x) = P(x) + \sum_{i=1}^{N} w_i \psi_i(x, g_{i1} \ldots g_{iM}), \quad (3)$$

where $\psi(x, g_{i1} \ldots g_{iM})$ is the $i^{th}$ RBF parameterized by M variables $g_{i1} \ldots g_{iM}$, $w_i$ is the weight of the $i^{th}$ RBF, and $P(x)$ is a polynomial term that spans the null space of the RBF.

Using the Heaviside function, $$H(z) = \begin{cases} 1, & z \geq 0 \\ 0, & \text{otherwise} \end{cases} \quad (4)$$

and the Dirac delta function $$\delta(z) = \frac{d}{dz} H(z),$$

the energy of Equation (2) can be expressed as $$E(\phi(w,g)) = \int_\Omega (I(x) - \mu_{in})^2 H(\phi(x)) dx + \int_\Omega (I(x) - \mu_o)^2 (1 - H(\phi(x))) dx + \gamma \int_\Omega \delta(\phi(x)) |\nabla \phi(x)| dx, \quad (5)$$

where $w = [w_1 \ldots w_N]^T$, and $g = [g_{ij}]$, where $i = 1 \ldots N$, $j = 1 \ldots M$.

Under this formulation of the problem, the variation of the energy with respect to the RBF parameter $g_{ij}$ and the RBF weight $w_i$ the following expression can be derived:

$$\frac{\partial E}{\partial g_{ij}} = \int_\Omega (I(x) - \mu_{in})^2 \delta(\phi(x)) \frac{\partial \phi}{\partial g_{ij}} dx - \int_\Omega (I(x) - \mu_{out})^2 \delta(\phi(x)) \frac{\partial \phi}{\partial g_{ij}} dx + \gamma \int_\Omega div\left(\frac{\nabla \phi}{|\nabla \phi|}\right) \delta(\phi(x)) \frac{\partial \phi}{\partial g_{ij}} dx, \quad (6)$$

which simplifies to the contour integral, $$\frac{\partial g_{ij}}{\partial t} = \frac{\partial E}{\partial g_{ij}} \quad (7)$$

$$= \int_C \left[ (I(x) - \mu_{in})^2 - (I(x) - \mu_{out})^2 + \gamma div\left(\frac{\nabla \phi}{|\nabla \phi|}\right) \right] \frac{\partial \phi}{\partial g_{ij}} dC,$$

and similarly, $$\frac{\partial w_i}{\partial t} = \frac{\partial E}{\partial w_{ij}} \quad (8)$$

$$= \int_C \left[ (I(x) - \mu_{in})^2 - (I(x) - \mu_{out})^2 + \gamma div\left(\frac{\nabla \phi}{|\nabla \phi|}\right) \right] \frac{\partial \phi}{\partial w_{ij}} dC.$$

These expressions take the form $$\int_C \frac{\partial E}{\partial \phi} \frac{\partial \phi}{\partial p} dC,$$

where p is $g_{ij}$ or $w_i$. This form results from the functional composition that resulted in application of the chain rule. Conceptually, these equations state that to determine the update of a parameter of an RBF, the contour C must be traversed, accumulating gradients at each point. That is, each point on the zero level set contributes to the update of the RBF parameters. Accordingly, unlike conventional level set update equations, the integral in Equations (7) and (8) combines measurements from all points along the zero level set, providing increased robustness to noise. Based on Equations (7) and (8), it is possible to update all parameters of each RBF, including the weights, position, orientation, anisotropy, etc. In such a case, each iteration of evolving all RBFs is order O(LMN), where L is the number of pixels on the zero level set, and N and M are the number of RBFs and the number of parameters for each RBF, respectively, as described above.

As described above, the energy minimization results in the form $$\int_C \frac{\partial E}{\partial \phi} \frac{\partial \phi}{\partial p} dC.$$

In general, this relationship can be utilized to transform any level set flow or curve evolution into an RBF evolution in this framework. For boundary-based image segmentation, a similar expression can be deduced for the geodesic flow, $$\frac{\partial g_{ij}}{\partial t} = \frac{\partial E}{\partial g_{ij}} = \int_C [F\kappa|\nabla \phi| - \nabla F \cdot \nabla \phi] \frac{\partial \phi}{\partial g_{ij}} dC \quad (9)$$

$$\frac{\partial w_{ii}}{\partial t} = \frac{\partial E}{\partial w_i} = \int_C [F\kappa|\nabla \phi| - \nabla F \cdot \nabla \phi] \frac{\partial \phi}{\partial w_i} dC, \quad (10)$$

where $F(I(x))$ is a function of an edge detector response, such as $$F = \frac{1}{1 + |\nabla I|^2},$$

and $\kappa$ is the curvature of the active contour at point x. It can be noted that with boundary-based segmentations, it may be helpful to run a GVF diffusion on the vector field $\nabla F$ before evolving the active contour.

As described above, basic equations are derived for evolution of RBFs to achieve either region-based or boundary-based image segmentation. However, the complete derivation depends on the RBFs chosen and their derivatives. According to an embodiment of the present invention, anisotropic Gaussian RBFs can be used for region-based or boundary-based image segmentation. However, the present invention is not limited to anisotropic Gaussian RBFS, and any RBF with an analytic derivative can be similarly used applying the framework described herein. The use of anisotropic RBFs may be advantageous because they are effective for approximating sharp corners, and they are a more general form of isotropic RBFs. Although 2D RBFs are used in the embodiments of the present invention described herein, it is to be understood that 3D RBFs can be used as well.

The equation for a 2D anisotropic Gaussian centered at point $(c_x, c_y)$, standard deviation $\sigma_x, \sigma_y$, and orientation angle $\theta$ has the function form:

$$\psi(x, y) = \psi(x, y) \exp\left[\frac{-1}{2\sigma_x^2 \sigma_y^2}(a_1(x - c_x)^2 - 2a_2(x - c_x)(y - c_y) + a_3(y - c_y)^2)\right], \quad (11)$$

where $$a_1 = \sigma_x^2 \cos^2\theta + \sigma_y^2 \sin^2\theta \quad (12)$$

$$a_2 = (\sigma_y^2 - \sigma_x^2)\cos\theta\sin\theta \quad (13)$$

$$a_3 = \sigma_x^2 \sin^2\theta + \sigma_y^2 \cos^2\theta. \quad (14)$$

This RBF is parameterized by the M=5 parameters, $g_j = [c_x, c_y, \sigma_x, \sigma_y, \theta]^T$. To implement the RBF flow (evolution), the derivative of the RBF must be determined with respect to each of these parameters. Doing so yields the following equations:

$$\frac{\partial \psi}{\partial c_x} = \psi \cdot \left(\frac{a_1 X - a_2 Y}{\sigma_x^2 \sigma_y^2}\right) \quad (15)$$

$$\frac{\partial \psi}{\partial c_y} = \psi \cdot \left(\frac{-a_2 X + a_3 Y}{\sigma_x^2 \sigma_y^2}\right) \quad (16)$$

$$\frac{\partial \psi}{\partial \theta} = \psi \cdot \left(-\frac{X^2 \frac{\partial a_1}{\partial \theta} - 2XY \frac{\partial a_2}{\partial \theta} + Y^2 \frac{\partial a_3}{\partial \theta}}{2\sigma_x^2 \sigma_y^2}\right) \quad (17)$$

$$\frac{\partial \psi}{\partial \sigma_x} = -\frac{\psi}{\sigma_x} + \psi \cdot \left[\frac{a_1 X^2 - 2a_2 XY + a_3 Y^2}{\sigma_x^3 \sigma_y^2} - \frac{1}{2\sigma_x^2 \sigma_y^2}\left(X^2 \frac{\partial a_1}{\partial \sigma_x} - 2XY \frac{\partial a_2}{\partial \sigma_x} + Y^2 \frac{\partial a_3}{\partial \sigma_x}\right)\right] \quad (18)$$

$$\frac{\partial \psi}{\partial \sigma_y} = -\frac{\psi}{\sigma_y} + \psi \cdot \left[\frac{a_1 X^2 - 2a_2 XY + a_3 Y^2}{\sigma_x^2 \sigma_y^3} - \frac{1}{2\sigma_x^2 \sigma_y^2}\left(X^2 \frac{\partial a_1}{\partial \sigma_y} - 2XY \frac{\partial a_2}{\partial \sigma_y} + Y^2 \frac{\partial a_3}{\partial \sigma_y}\right)\right] \quad (19)$$

where $$X = (x - c_x) \quad (20)$$

$$Y = (x - c_y) \quad (21)$$

$$\frac{\partial a_1}{\partial \theta} = -2(\sigma_x^2 - \sigma_y^2)\cos\theta\sin\theta \quad (22)$$

$$\frac{\partial a_2}{\partial \theta} = -2(\sigma_x^2 - \sigma_y^2)(\cos^2\theta - \sin^2\theta) \quad (23)$$

$$\frac{\partial a_3}{\partial \theta} = -2(\sigma_x^2 - \sigma_y^2)\cos\theta\sin\theta \quad (24)$$

-continued $$\frac{\partial a_1}{\partial \sigma_x} = 2\sigma_x \cos^2\theta \quad (25)$$

$$\frac{\partial a_2}{\partial \sigma_x} = -2\sigma_x \cos\theta \sin\theta \quad (26)$$

$$\frac{\partial a_3}{\partial \sigma_x} = 2\sigma_x \sin^2\theta \quad (27)$$

$$\frac{\partial a_1}{\partial \sigma_y} = 2\sigma_y \sin^2\theta \quad (28)$$

$$\frac{\partial a_2}{\partial \sigma_y} = 2\sigma_y \cos\theta \sin\theta \quad (29)$$

$$\frac{\partial a_3}{\partial \sigma_y} = 2\sigma_y \cos^2\theta. \quad (30)$$

Using the above equations (15-30) an equation for each parameter (and weight) of an anisotropic Gaussian RBF can be expressed in the form derived above (e.g., equations (7) and (8)). Accordingly, the following is a set of coupled differential equations that drive the evolution of the $i^{th}$ RBF:

$$\frac{dc_{ix}}{dt} = \int_C Dw_i \psi_i \cdot \left( \frac{a_{i1} X_i - a_{i2} Y_i}{\sigma_{ix}^2 \sigma_{iy}^2} \right) dC \quad (31)$$

$$\frac{dc_{iy}}{dt} = \int_C Dw_i \psi_i \cdot \left( \frac{-a_{i2} X_i + a_{i3} Y_i}{\sigma_{ix}^2 \sigma_{iy}^2} \right) dC \quad (32)$$

$$\frac{dw_i}{dt} = \int_C D\psi_i dC \quad (33)$$

$$\frac{d\theta_i}{dt} = \int_C Dw_{\chi i} \cdot \psi_i \cdot \left( -\frac{X_i^2 \frac{\partial a_{i1}}{\partial \theta_i} - 2X_i Y_i \frac{\partial a_{i2}}{\partial \theta_i} + Y_i^2 \frac{\partial a_{i3}}{\partial \theta_i}}{2\sigma_{ix}^2 \sigma_{iy}^2} \right) dC \quad (34)$$

$$\frac{d\sigma_{ix}}{dt} = \int_C Dw_i \cdot \left\{ -\frac{\psi_i}{\sigma_{ix}} + \psi_i \cdot \left[ \frac{a_{i1} X_i^2 - 2a_{i2} X_i Y_i + a_{i3} Y_i^2}{\sigma_{ix}^3 \sigma_{iy}^2} - \frac{1}{2\sigma_{ix}^2 \sigma_{iy}^2} \left( X_i^2 \frac{\partial a_{i1}}{\partial \sigma_{ix}} - 2X_i Y_i \frac{\partial a_{i2}}{\partial \sigma_{ix}} + Y_i^2 \frac{\partial a_{i3}}{\partial \sigma_{ix}} \right) \right] \right\} dC \quad (35)$$

$$\frac{d\sigma_{iy}}{dt} = \int_C Dw_i \cdot \left\{ -\frac{\psi_i}{\sigma_{iy}} + \psi_i \cdot \left[ \frac{a_{i1} X_i^2 - 2a_{i2} X_i Y_i + a_{i3} Y_i^2}{\sigma_{ix}^2 \sigma_{iy}^3} - \frac{1}{2\sigma_{ix}^2 \sigma_{iy}^2} \left( X_i^2 \frac{\partial a_{i1}}{\partial \sigma_{iy}} - 2X_i Y_i \frac{\partial a_{i2}}{\partial \sigma_{iy}} + Y_i^2 \frac{\partial a_{i3}}{\partial \sigma_{iy}} \right) \right] \right\} dC \quad (36)$$

where $$X_i = (x - c_{ix}) \quad (37)$$

$$Y_i = (y - c_{iy}) \quad (38)$$

and for region-based segmentation, $$D = \left[ (I(x) - \mu_{in})^2 - (I(x) - \mu \text{out})^2 + \gamma div\left( \frac{\nabla \phi}{|\nabla \phi|} \right) \right] \quad (39)$$

while for boundary-based segmentation, $$D = [F\kappa |\nabla \phi| - \nabla F \cdot \nabla \phi]. \quad (40)$$

In order to utilize the above described systems of equations in an image segmentation method, these equations can be readily implemented by one skilled in the art as computer executable instructions on a computer.

Although the derivation of the set of differential equations to drive an anisotropic Gaussian RBF is described above, a similar derivation can be performed for any RBF interpolant that has an analytic derivative, including for example, multi-order RBFs and Wedland's RBFs. It may be advantageous for image segmentation to use RBFs that decay from their center location.

FIG. 1 illustrates an example of image segmentation by evolving RBFs using the RBF evolution equations (31)-(36) derived above according to an embodiment of the present invention. As illustrated in FIG. 1, a white square having sharp corners is segmented from a dark background. Images (a)-(c) of FIG. 1 show region-based segmentation using the RBF evolution equations derived above, and images (e)-(g) show boundary-based images segmentation using the RBF evolution equations derived above. Images (a) and (e) show initialization of a contour 102, which is the zero level set of the implicit function $\phi(x, y)$. The implicit function $\phi(x, y)$ is defined as a summation of RBFs 104 and 106. In FIG. 1, reference numeral 104 refers to all negative weighted RBFs, and reference numeral 106 refers to all positive weighted RBFs. In images (a) and (e), negative weighted RBFs 104 are located in the center of the image, and positive weighted RBFs 106 are located around the edges of the image. The ellipse around each of the RBFs 104 and 106 is a visualization of the anisotropy of each of RBFs 104 and 106. Initially (in images (a) and (e)), the RBFs 104 and 106 are all isotropic and are rendered as circles. Images (b) and (f) show an intermediate stage of the segmentation methods, and images (c) and (g) show final segmentation results after the methods have converged. As shown in images (b), (c), (f), and (g), the RBFs 104 and 106 changed their positions, weights, and anisotropy in order to deform the contour 102 to segment the white square. These parameters of the RBFs are evolved using the RBF evolution equations (31)-(36) derived above. Images (d) and (h) respectively show results of conventional region-based and boundary-based image segmentation techniques which evolve only the weights and locations of isotropic RBFs. As shown in images (d) and (h), the conventional methods are do not accurately capture the sharp corners of the square.

Figure 2:
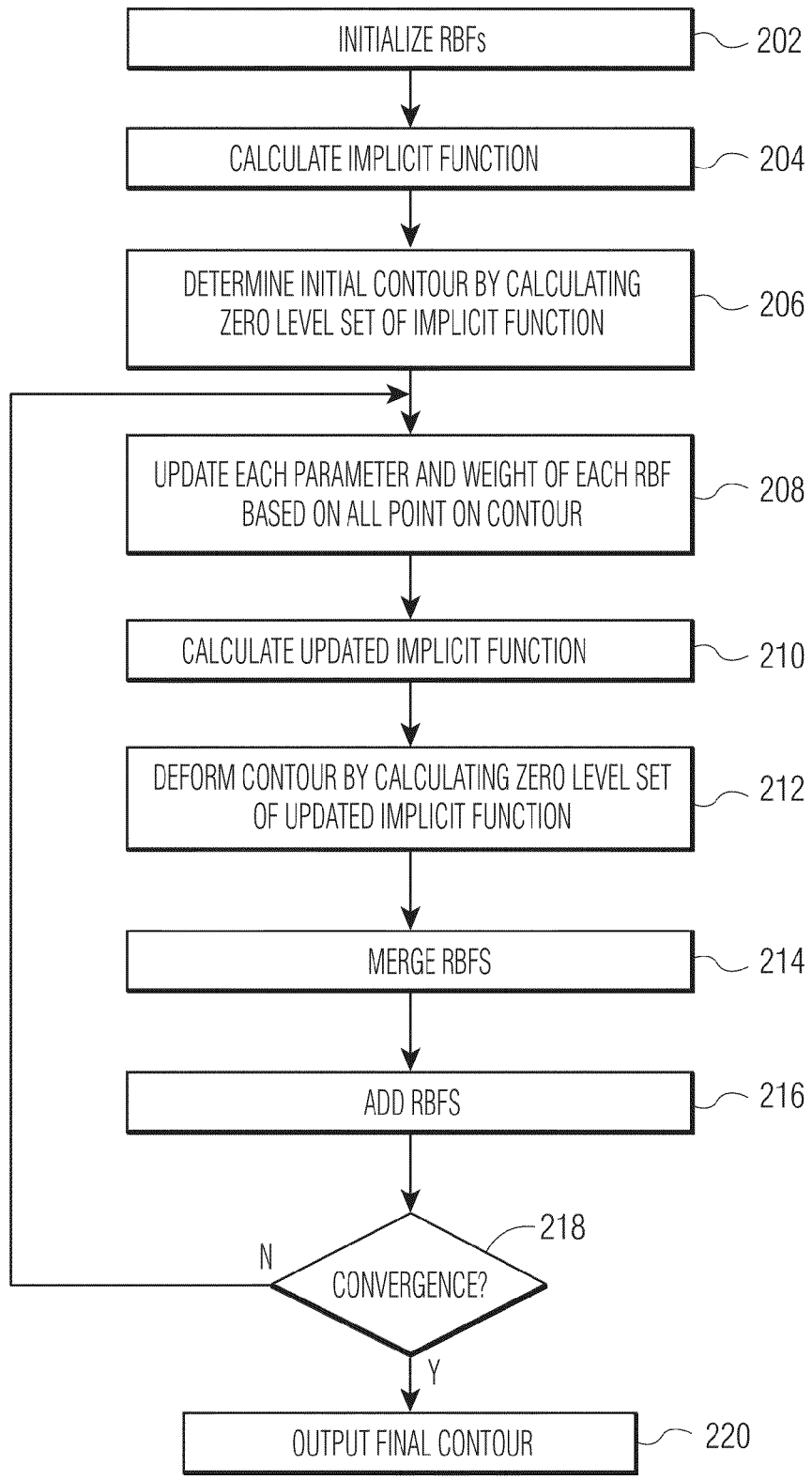
FIG. 2 illustrates a method of segmenting an object in an image according to an embodiment of the present invention.

FIG. 2 illustrates a method of segmenting an object in an image according to an embodiment of the present invention. This method utilizes the RBF evolution equations derived above to evolve multiple parameters of RBFs in order to deform a contour such that the contour matches boundaries of the target object. This method can be performed using region-based or boundary based image segmentation.

As illustrated in FIG. 2, at step 202, a set of RBFs is initialized. In order to initialize the RBFs, initial RBFs are distributed around the image. The initial RBFs define an initial contour for the image segmentation method. The RBFs may be distributed automatically, for example, by distributing positive weighted RBFs around the image border or in a large ring around the image center and negative weighted RBFs in the center of the image. This initial distribution is shown in images (a) and (e) of FIG. 1. It is also possible that the RBFs be distributed manually. The initialization is flexible, as the initial contour can be inside, outside, or both inside and outside of the object being segmented.

At step 204, an implicit function is calculated based on the set of RBFs. The implicit function is calculated as a summation of the set of RBFs. This is expressed in Equation (3). At step 206, the initial contour is determined by calculating the zero level set of the implicit function. The zero level set of the implicit function is all points (pixels) at which the implicit function is equal to zero. Accordingly, the initial contour is a contour consisting of pixels for which the summation of all of the RBFs is equal to zero.

At step 208, each parameter and weight of each RBF is updated based on all points on the contour. At this step, the method cycles through each RBF and updates all the parameters of each RBF using the RBF evolution equations derived above. For example, for anisotropic Gaussian RBFs, the center point, anisotropy, and weight of each RBF are updated for each RBF. The anisotropy for Gaussian RBFs can be defined by an orientation, and standard deviation in orthogonal directions. The center point is updated using Equations (31) and (32), the weight is updated using Equation (33), the orientation is updated using Equation (34) and the standard deviation is updated using Equations (35) and (36). As described above, these equations can be used for region-based segmentation (Equation (39)) or boundary-based segmentation (Equation (40)). The equations for updating each of the parameters and the weight of each RBF integrate over the contour, thus all points (pixels) on the contour are used to update each parameter of each RBF. The updates to each parameter of each RBF changes the position, eight, orientation, and anisotropy of each RBF, thus evolving each RBF.

At step 210, an updated implicit function is calculated based on the updated RBFs. The updated implicit function is the summation of the updated RBFs. At step 212, the contour is deformed by calculating the zero level set of the updated implicit function. Accordingly, the evolution of the RBFs causes the contour to deform towards the boundaries of the target object to be segmented.

At step 214, RBFs that are sufficiently close together are merged into a single RBF. For two RBFs, it is determined whether the RBFs are sufficiently close together, and if so, they are combined and replaced by a new RBF. In the case of a merge, let the $i^{th}$ RBF be parameterized by $\lfloor c_{ix}, c_{iy}, \sigma_{ix}, \sigma_{iy}, \theta_i \rfloor$ and weight $w_i$, and the $j^{th}$ RBF by $\lfloor c_{jx}, c_{jy}, \sigma_{jx}, \sigma_{jy}, \theta_j \rfloor$ and weight $w_j$, $i \neq j$. If the distance between two RBFs, $d_{ij} = \sqrt{(c_{ix}-c_{jx})^2+(c_{iy}-c_{jy})^2}$ becomes less than a threshold $T_M$, then the RBFs are combined by deleting them and replacing them with a new RBF, $$\left[\frac{1}{2}(c_{ix}+c_{jx}), \frac{1}{2}(c_{iy}+c_{jy}), \sigma_{ix}+\sigma_{jx}, \sigma_{iy}+\sigma_{jy}, \theta_i+\theta_j\right]$$

and weight $w_i+w_j$. This new RBF is the sum of the two RBFs being merged and is centered halfway between the two RBFs being merged.

At step 216, RBFs are added in regions of the image where the gradient of the implicit function is high and there are no existing RBFs. In order to avoid adding new RBFs too close to an existing RBF, the method utilizes a function $$A(x,y) = \frac{\nabla \phi(x,y)}{\max(\phi(x,y))} \cdot S(x,y), \text{ where } \frac{\nabla \phi(x,y)}{\max(\phi(x,y))}$$

is the normalized gradient of the implicit function and $S(x,y)$ is a splat buffer formed as:

$$S(x,y) = \prod_i \left(1 - e^{-\lfloor(c_{ix}-x)^2+(c_{iy}-y)^2\rfloor/(2\sigma^2)}\right) \quad (41)$$

where $\sigma$ is a standard deviation of a 2D Gaussian function. The splat buffer is close to one where there are no RBFs, and decreases to zero near RBF centers. Therefore, function $A(x,y)$ is large where there are no RBFs and the gradient of the implicit function is high. The value of $A(x,y)$ is calculated over the image, and an RBF is added at any position $(x,y)$ where $A(x,y)$ has a value above a threshold $T_A$. This generates a new RBF that is not too close to an existing RBF, yet is located at a point of high gradient in the implicit function. The threshold $T_A$ prevents the method from adding too many constraints where they are not needed. The weight of the newly added isotropic RBF is initially zero, and subsequent iterations will update the weight and anisotropy of the new RBF.

At step 218 it is determined whether the contour has converged. According to an embodiment of the present invention, it is possible to determine convergence of the contour by monitoring the energy $E(C)$ of the contour. For example, in region-based segmentation, the energy $E(C)$ given by Equation (2). The energy $E(C)$ for the contour can be calculated at each iteration and compared to the energy $E(C)$ calculated at the previous iteration. If the difference is less than a threshold, it can be determined that the contour has converged. If the contour has not converged, the method returns to step 208 and updates the parameters of each RBF again, thus deforming the contour again. This is repeated until the contour converges. If the contour has converged, the method proceeds to step 220.

At step 220, the final contour is output as the boundaries of the target object. For example, the final contour can be displayed on the image to segment the target object, or stored in memory or storage of a computer system.

FIG. 3 illustrates exemplary image segmentation results in which RBFs are merged and added. As illustrated in FIG. 3, two white circles are segmented from the dark background using the method of FIG. 2. Image (a) shows initialization of the RBFs and the initial contour, image (b) shows an intermediate stage of the segmentation method, and image (c) shows a final contour at convergence. As shown in image (b), the location, orientation, anisotropy, and weights of the RBFs in image (a) have been updated. Furthermore, new RBFs 302 were added in image (b) that were not in image (a). The new RBFs 302 were added as described above in step 216. Image (c) shows that RBFs of image (b) have been merge into a single RBF 304 in image (c). The RBFs were merged as described above in step 214. Image (c) also illustrates a contour that underwent a topological change from the initial contour in image (a) to the final contour in image (c). The final contour split to separately segment both of circles.

FIG. 4 illustrates exemplary image segmentation results of a noisy image. As illustrated in FIG. 4, a light circle is segmented from a dark background using the method of FIG. 2 with a region-based active contour. In the images of FIG. 4, Gaussian white noise of unit standard deviation was added to the image to test the method's robustness to noise. Image (a) shows initialization of the RBFs and the initial contour, image (b) shows an intermediate stage of the segmentation method, and image (c) shows a final contour at convergence. As shown by images (a), (b), and (c), the square is successfully segmented despite the low signal to noise ratio.

FIG. 5 illustrates exemplary image segmentation results of an ultrasound fetal image. As illustrated in FIG. 5, the method of FIG. 2 can be applied to medical images, such as ultrasound images to segment anatomic structures in medical images The images of FIG. 5 show segmentation of a fetal structure in an ultrasound image. Image (a) shows initialization of the RBFs and the initial contour, image (b) shows an intermediate stage of the segmentation method, and image (c) shows a final contour that has converged to the boundaries of the fetal structure.

Figure 6:
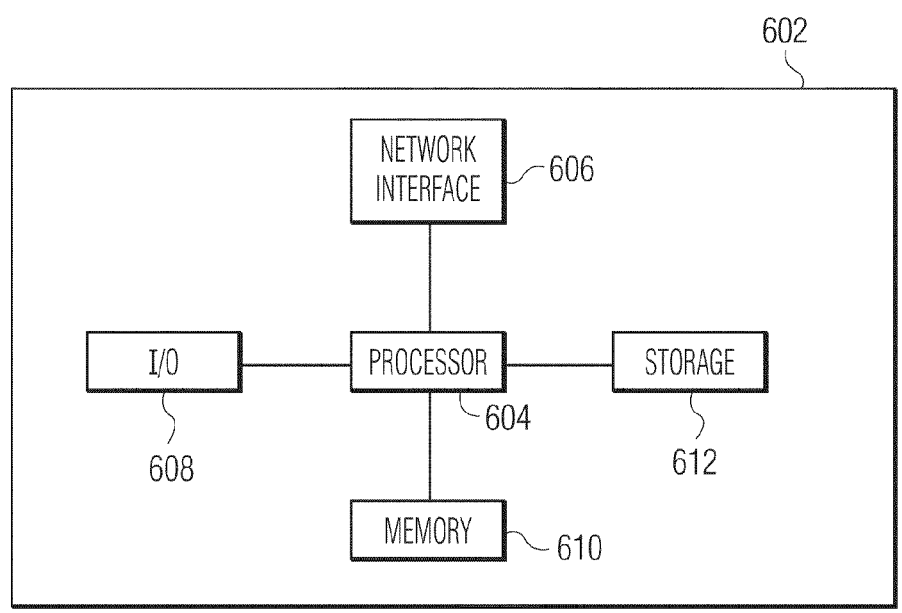
FIG. 6 is a high level block diagram of a computer capable of implementing the present invention.

The above-described methods for image segmentation by evolving RBFs may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, an image segmentation application may be defined by the computer program instructions stored in the memory 610 and/or storage 612 and controlled by the processor 604 executing the computer program instructions. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Descriptions but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a target object in an image comprising:
   initializing a plurality of radial basis functions (RBFs) defining a contour comprising a plurality of pixels on the image, each of the RBF having an associated weight and a plurality of parameters;
   iteratively deforming the contour by updating each of the parameters of each RBF and the weight of each RBF based on each pixel of the contour, until the contour converges; and
   storing a final contour at convergence as boundaries of said target object.

2. The method of claim 1, wherein said step of initializing a plurality of RBFs comprises:
   distributing said plurality of RBFs on said image;
   calculating an implicit function as a summation of said plurality of RBFs; and
   calculating a zero level set of said implicit function to determine the contour.

3. The method of claim 1, wherein said step of initializing a plurality of RBFs comprises:
   distributing a plurality of positive weighted RBFs around a border of the image; and
   distributing a plurality of negative weighted RBFs at a center of the image.

4. The method of claim 1, wherein said plurality of parameters of each RBF comprise location and anisotropy.

5. The method of claim 1, wherein said step of iteratively deforming the contour by updating each of a plurality of parameter and a weight of each RBF comprises:
   updating each parameter and the weight of an RBF based on gradients of the RBF at each pixel of the contour.

6. The method of claim 1, wherein said step of iteratively deforming the contour by updating each of a plurality of parameter and a weight of each RBF comprises:
   updating the parameters and the weight of each RBF using a set of coupled differential equations derived based on one of an image based or boundary-based image segmentation energy formulation;
   calculating an implicit function as a summation of the plurality of the RBFs after the parameters and the weight of each RBF are updated; and
   deforming the contour by calculating a zero level set of the implicit function.

7. The method of claim 1, further comprising:
   detecting when a distance between center points of two RBFs is less than a threshold;
   when the distance between center points of two RBFs is less than a threshold, replacing said two RBFs with a single RBF that is the sum of said two RBFs and is centered between the center points of the two RBFs.

8. The method of claim 1, further comprising:
   detecting an area in the image where a gradient of an implicit function defined by the RBFs is high and no RBFs exist; and
   adding an RBF located in said area.

9. The method of claim 1, wherein said step of iteratively deforming the contour by updating each of a plurality of parameter and a weight of each RBF comprises:
   changing an anisotropy of each RBF.

10. The method of claim 1, wherein said RBFs comprise anisotropic Gaussian RBFs.

11. The method of claim 10, wherein said plurality of parameters of each RBF comprise a center point, standard deviation in orthogonal directions, and an orientation.

12. The method of claim 1, wherein a location of at least one of said plurality of RBFs is at a pixel of the image other than the pixels of said contour.

13. The method of claim 1, further comprising:
   displaying the image showing said final contour.

14. An apparatus for segmenting a target object in an image comprising:
   means for initializing a plurality of radial basis functions (RBFs) defining a contour comprising a plurality of pixels on the image, each of the RBF having an associated weight and a plurality of parameters;
   means for iteratively deforming the contour by updating each of the parameters of each RBF and the weight of each RBF based on each pixel of the contour, until the contour converges; and
   means for storing a final contour at convergence as boundaries of said target object.

15. The apparatus of claim 14, wherein said means for initializing a plurality of RBFs comprises:
   means for distributing said plurality of RBFs on said image;
   means for calculating an implicit function as a summation of said plurality of RBFs; and
   means for calculating a zero level set of said implicit function to determine the contour.

16. The apparatus of claim 14, wherein said plurality of parameters of each RBF comprise location and anisotropy.

17. The apparatus of claim 14, wherein said means for iteratively deforming the contour by updating each of a plurality of parameter and a weight of each RBF comprises:
- means for updating the parameters and the weight of each RBF using a set of coupled differential equations derived based on one of an image based or boundary-based image segmentation energy formulation;
- means for calculating an implicit function as a summation of the plurality of the RBFs after the parameters and the weight of each RBF are updated; and
- deforming the contour by calculating a zero level set of the implicit function.

18. The apparatus of claim 14, further comprising:
- means for detecting when a distance between center points of two RBFs is less than a threshold;
- means for replacing said two RBFs with a single RBF that is the sum of said two RBFs and is centered between the center points of the two RBFs.

19. The apparatus of claim 14, further comprising:
- means for detecting an area in the image where a gradient of an implicit function defined by the RBFs is high and no RBFs exist; and
- means for adding an RBF located in said area.

20. A computer readable medium encoded with computer executable instructions for segmenting a target object in an image, the computer executable instructions defining steps comprising:
- initializing a plurality of radial basis functions (RBFs) defining a contour comprising a plurality of pixels on the image, each of the RBF having an associated weight and a plurality of parameters;
- iteratively deforming the contour by updating each of the parameters of each RBF and the weight of each RBF based on each pixel of the contour, until the contour converges; and
- storing a final contour at convergence as boundaries of said target object.

21. The computer readable medium of claim 20, wherein the computer executable instructions defining the step of initializing a plurality of RBFs comprise computer executable instructions defining the steps of:
- distributing said plurality of RBFs on said image;
- calculating an implicit function as a summation of said plurality of RBFs; and
- calculating a zero level set of said implicit function to determine the contour.

22. The computer readable medium of claim 20, wherein said plurality of parameters of each RBF comprise location and anisotropy.

23. The computer readable medium of claim 20, wherein the computer executable instructions defining the step of iteratively deforming the contour by updating each of a plurality of parameter and a weight of each RBF comprise computer executable instructions defining the steps of:
- updating the parameters and the weight of each RBF using a set of coupled differential equations derived based on one of an image based or boundary-based image segmentation energy formulation;
- calculating an implicit function as a summation of the plurality of the RBFs after the parameters and the weight of each RBF are updated; and
- deforming the contour by calculating a zero level set of the implicit function.

24. The computer readable medium of claim 20, further comprising computer executable instructions defining the steps of:
- detecting when a distance between center points of two RBFs is less than a threshold;
- when the distance between center points of two RBFs is less than a threshold, replacing said two RBFs with a single RBF that is the sum of said two RBFs and is centered between the center points of the two RBFs.

25. The computer readable medium of claim 20, further comprising computer executable instructions defining the steps of:
- detecting an area in the image where a gradient of an implicit function defined by the RBFs is high and no RBFs exist; and
- adding an RBF located in said area.

* * * * *